(12) United States Patent
Jeppe et al.

(10) Patent No.: US 8,108,110 B2
(45) Date of Patent: Jan. 31, 2012

(54) AGRICULTURAL WORKING MACHINE

(75) Inventors: Eckehard Jeppe, Zierenberg (DE);
Reinhard Laing, Harsewinkel (DE)

(73) Assignee: CLAAS Selbstfahrende Erntemaschinen GmbH, Harsewinkel (DE)

( * ) Notice: Subject to any disclaimer, the term of this patent is extended or adjusted under 35 U.S.C. 154(b) by 952 days.

(21) Appl. No.: 12/107,610

(22) Filed: Apr. 22, 2008

(65) Prior Publication Data

US 2008/0288144 A1    Nov. 20, 2008

(30) Foreign Application Priority Data

May 14, 2007    (DE) .......................... 10 2007 022 899

(51) Int. Cl.
*A01B 69/00* (2006.01)
*A01B 63/00* (2006.01)
*G01D 3/10* (2006.01)
*G01D 7/04* (2006.01)

(52) U.S. Cl. .......... 701/50; 56/10.2 R; 56/1; 56/DIG. 15

(58) Field of Classification Search .................... 701/50, 701/52, 1; 700/170, 90; 56/10.2 R, 10.2 A–10.2 H, 56/10.2 J, 10.3, 10.4, 10.8, 10.1, 1, DIG. 15

See application file for complete search history.

(56) References Cited

U.S. PATENT DOCUMENTS

| 5,485,897 | A  | * | 1/1996 | Matsumoto et al. | .......... 187/399 |
| 2006/0006026 | A1 | * | 1/2006 | Amo et al. | ..................... 187/391 |
| 2006/0069485 | A1 | * | 3/2006 | Diekhans | ......................... 701/50 |

FOREIGN PATENT DOCUMENTS

| DE | 198 05 133 | 8/1999 |
| EP | 1 031 263 | 8/2000 |

* cited by examiner

*Primary Examiner* — Christopher J. Novosad
(74) *Attorney, Agent, or Firm* — Michael J. Striker

(57) ABSTRACT

An agricultural working or harvesting machine has at least one working unit and a driver's cab in which, in a basic electronic display area of a display unit, several machine and/or crop material parameters set up in different functionality windows are visualized. The machine and/or crop material parameters set up in the functionality windows are activated and controlled using an operating device, and, in the working mode at least, at least one additional display area that includes the functionality window superimposed on the basic display area is displayable in the display unit, it being possible to control and activate the at least one functionality window of the additional display area using at least one separate operating device.

15 Claims, 3 Drawing Sheets

AGRICULTURAL WORKING MACHINE

CROSS-REFERENCE TO A RELATED APPLICATION

The invention described and claimed hereinbelow is also described in German Patent Application DE 10 2007 022 899.8 filed on May 14, 2007. This German Patent Application, subject matter of which is incorporated herein by reference, provides the basis for a claim of priority of invention under 35 U.S.C. 119(a)-(d).

BACKGROUND OF THE INVENTION

The present invention relates to an agricultural working machine with an electronic display unit.

Publication DE 198 05 133 A1 discloses an electronic display and/or operating device with a display and status display fields, in the case of which the use of certain symbols makes it possible for the operating state or out-of-operation state of different working units to be displayed in the same display field. According to the invention, the out-of-operation state of a working unit is indicated, e.g., by the symbol of a line passing through the particular working unit, the line being located above the symbol provided. On the other hand, the operating state of a working unit is indicated, e.g., when a display assigned to the symbol provided illuminates. In this manner, no additional symbols are used to display the operating state or out-of-operation state. Additional symbols would reduce the amount of space available in the display. Various buttons used to switch the working units on and off are located in the display.

The disadvantage of a display structure of this type is the fact that the driver of an agricultural working machine is limited in terms of the information displayed—the driver is only shown the operating state or the out-of-operation state of the working units shown. No additional information may be provided, e.g., in the form of additional display fields appearing in the display.

Publication EP 1 031 263 A discloses a device for controlling working parameters of agricultural working machines. The control includes a control and regulating unit, to which a control terminal, sensors, and actuators are connected. The operator enters the operating parameters of the working machine using the control terminal. A display unit is also connected to the control terminal. Various operating modes may be displayed, e.g., a normal operating mode, a set-up operating mode used at start-up to enter parameters, and an emergency operating mode. The specific manner in which the parameters appear in the display unit, and the way to input information and perform adjustments, in particular, are not described in detail, however.

Due to the growing complexity of agricultural working or harvesting machines, such as combine harvesters or forage harvesters, which include a lot of equipment for processing crop material—the operating parameters of which must be adapted to changing harvesting conditions in the working or harvesting mode—these harvesting machines include display and/or operating devices, with which all operating parameters or any other type of machine information may be visualized in the display area and changed using input means. The operating parameters are stored in functionality windows in the display area. Due to the large number of operating parameters to be monitored and adjusted, it is known that a central operating device may be used to activate and adjust all of the parameters shown in the display area. Experienced operators typically have no problem reading all of the working parameters and other machine information and adjusting them, if necessary, using the central operating device.

In the harvesting mode of agricultural harvesting machines in particular, it is often necessary for the operator to repeatedly adjust certain operating parameters, due to changing harvesting conditions. In this case, operators with little or no experience often become overwhelmed due to the large number of operating parameters shown in the display area, and they must repeatedly search—using the central operating device—for the operating parameters displayed in the functionality windows—which requires a relatively great deal of time—in order to be able to make the desired changes to the operating parameters. As a result, the operator is distracted from the actual control of the harvesting machine, and/or he makes the necessary adjustments too late or not at all, with the end result being a less successful harvest.

SUMMARY OF THE INVENTION

The object of the present invention, therefore, is to provide a display unit with assigned input means, which avoids the disadvantages of the related art and is easy to operate, particularly in the working mode.

In keeping with these objects and with others which will become apparent hereinafter, one feature of the present invention resides, briefly stated, in a machine selected from the group consisting of an agricultural working machine and a harvesting machine, comprising at lest one working unit; a driver's cab having a display unit with a basic electronic display in which several parameters selected from the group consisting of machine parameters, crop parameters and both set up in different functionality windows are visualized; an operating device configured so that said parameters set up in the functionality windows are activated and controlled using said operating device, said display unit having at least one additional display area, having a functionality window superposed on said basic display, area such that in a working or harvesting mode at least, said at least one additional display area that includes the functionality window superimposed on said basic display unit is displayable in said display unit; and at least one separate operating device configured for controlling and activating said at least one functionality window of said additional display area.

Given that, in the working mode, at least, at least one additional display area that includes at least one functionality window superimposed on the basic display area is displayable in the display unit, it being possible to activate and control the at least one additional display area and the at least one functionality window using at least one separate operating device, it is ensured that the operator may quickly access—in the working mode, at least—the machine and/or crop material parameters set up in the functionality window of the additional display area and make adjustments if necessary without having to spend a lot of time searching in functionality windows, some of which are contained in submenus.

Preferably, the machine and/or crop material parameters set up in the functionality windows of the additional display area and/or in the basic display area may be freely defined by the operator, thereby ensuring that an inexperienced operator, in particular, may set up the functionality windows with machine and/or crop material parameters that must be adapted often during the harvesting operation due to changing harvesting conditions. The separate operating device makes it possible for the operator to advantageously access the machine and/or crop material parameters.

The present invention is particularly advantageous when the basic display area and the additional display area are displayed in the display unit as windows in a window format, although the additional display area is preferably displayed in a circular format. As a result, due to the intended separate control of the basic display area and the additional display area using separate operating devices, the operator is capable of very quickly controlling and adjusting the machine and/or crop material parameters contained in the functionality windows. The basic display area preferably visually dominates the additional display area, so that the operator always recognizes the basic display area as such.

Given that the positioning of the additional display area in the display unit depends on which functionality window was accessed most recently in the basic display area, that is, the functionality window that was accessed most recently in the basic display area is not covered by the additional display area when it appears, it is ensured that the operator always has the functionality window accessed most recently in the basic display area in his field of view, even when the additional display area is activated.

In the simplest case, the additional display area disappears automatically after a predefined period of time, so that the basic display area with its functionality windows is always visible to the operator, thereby ensuring that the operator always has the basic information in his field of view.

An advantageous embodiment of the present invention results when the at least one functionality window of the additional display area opens automatically when one of the defined threshold values assigned to the particular functionality window is fallen below—the threshold values preferably including machine-specific or crop material-specific values—so that the driver is informed immediately of critical states and may take suitable action.

Given that the machine and/or crop material parameters set up in the functionality windows are freely definable, it is ensured that a usage is possible that is adapted to the working or harvesting conditions, and that takes the preferences of the particular operator into account. As a result, it is possible to provide the particular operator with information tailored to his needs.

The present invention is particularly useful in practice when the operating devices for activating the basic display area and the control of the functionality windows contained therein are designed as rotary knobs and/or push buttons.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
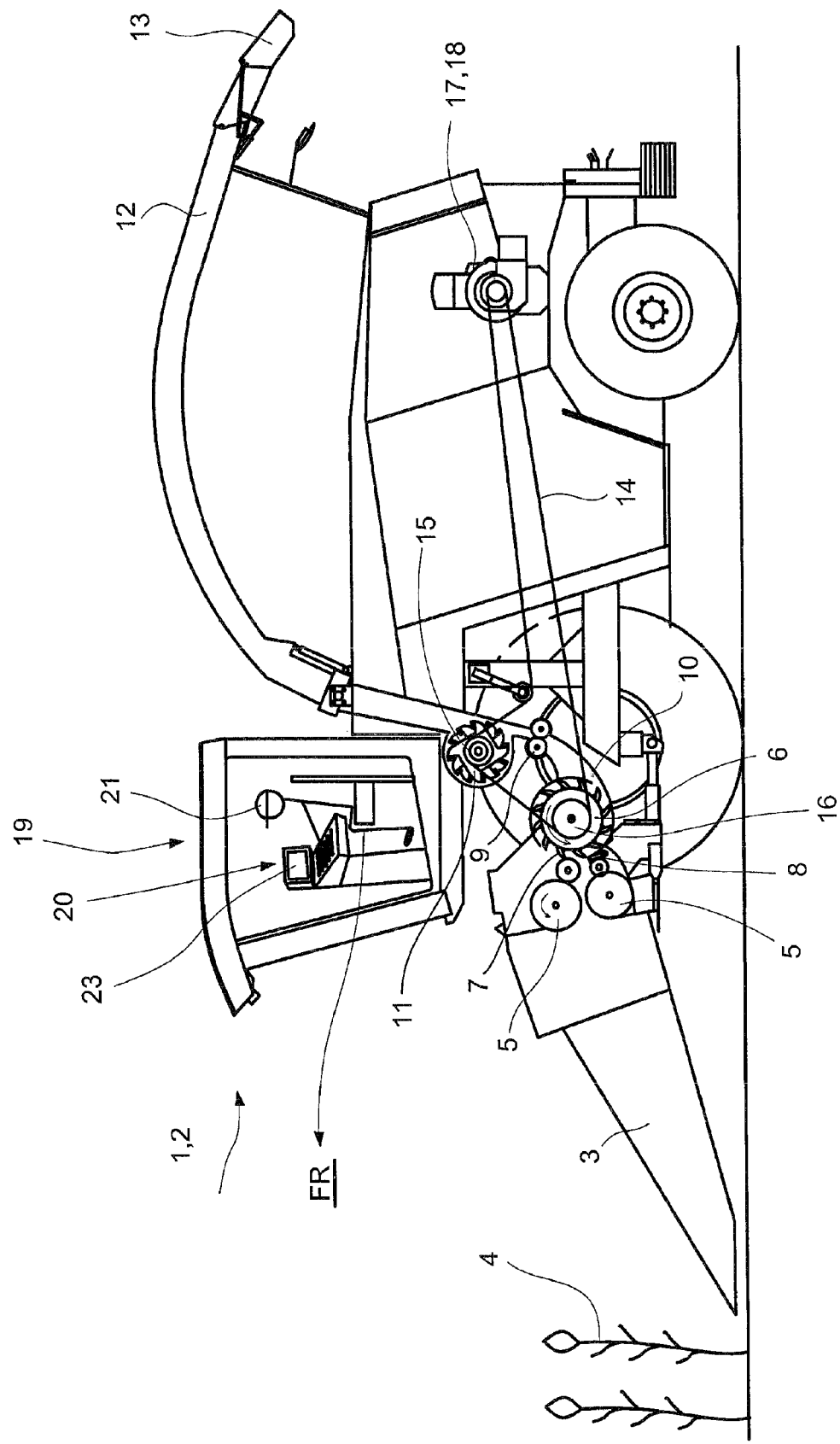
FIG. 1 shows a schematic cross section of an agricultural working machine designed as a forage harvester, and its working units.

FIG. 1 shows a sectional side view of an agricultural harvesting machine 2 designed as a self-propelled forage harvester 1 with different working units, which will be described in greater detail below. A front attachment 3 is assigned to forage harvester 1 in the front, as viewed in the direction of travel FR, which picks up crop material 4 during the working operation of forage harvester 1, and which may fragmentize it, then guide it to downstream intake and compression rollers 5. Intake and compression rollers 5 guide crop material 4 to downstream, rotating chopper drum 6, the cutter blade 7 of which fragmentizes crop material 4 at a shear bar 8.

Fragmentized crop material 4 is subsequently transferred to a post-fragmentation device 9, which pounds the crop grains, e.g., corn, and transfers them via a conveyer chute 10 to a post-accelerator 11. Post-accelerator 11 accelerates fragmentized crop material 4 and conveys it—via a horizontally and vertically displaceable upper discharge chute 12 and an upper discharge chute flap 13 assigned thereto such that it can swivel, in order to regulate the distance the crop material stream is thrown—toward a not-shown transport device assigned to upper discharge chute 12.

Chopper drum 6 and post-accelerator 11 are connected via the same drive belt 14 and pulleys 15, 16 assigned thereto, with a drive unit 18 designed as a diesel engine 17. Via a terminal 20, which is located in driver's cab 19 and which is described in greater detail with reference to FIGS. 2 and 3, operator 21 may adjust machine and crop-material parameters, such as the height of front attachment 3, the length of cut of crop material 4, or the sub-width of front attachment 3. The terminal has a housing 22 that contains a display unit 23. In addition, operating devices—which will be described in greater detail with reference to FIGS. 2 and 3—are located below and in front of display unit 23, which are used to control and adjust the machine and/or crop material parameters shown in display unit 23.

Figure 2:
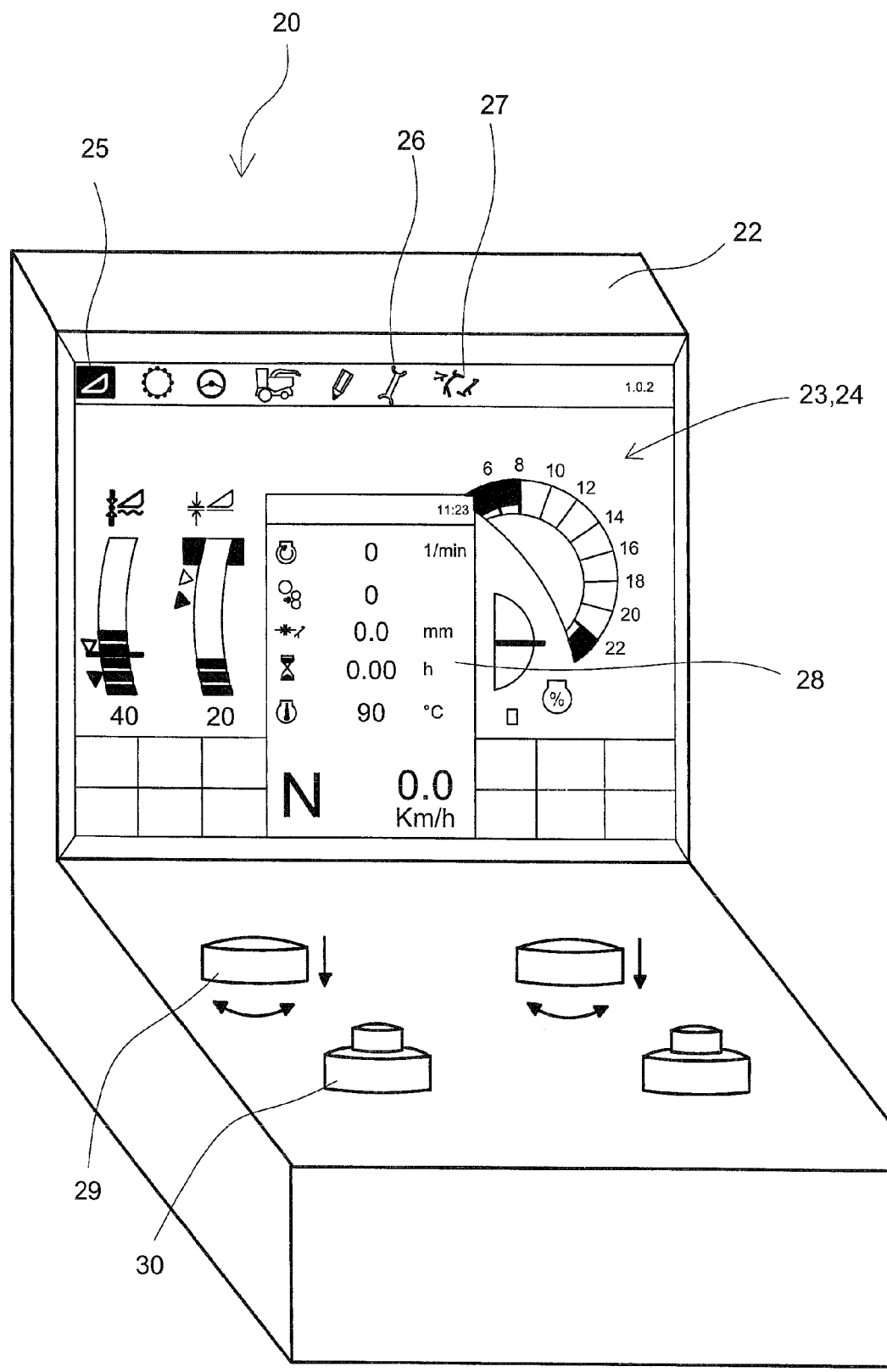
FIG. 2 shows a terminal with a basic display area with functionality windows depicted in a display unit.

Terminal 20 is shown in an enlarged view in FIG. 2. Display unit 23 displays, e.g., the harvesting mode of a forage harvester 1 during the harvesting operation. Display unit 23 is filled completely with a basic display area 24. Various functionality windows 25, 26, 27 in which machine and/or crop material parameters are stored are displayed in the upper region of basic display area 24. They need not necessarily be depicted in basic display area 24 simultaneously. Instead, it may be possible to call them up via menus and submenus, in which machine and/or crop material parameters may be grouped in a reasonable manner. Operator 21 may freely select which machine and/or crop material parameters are set up in individual functionality windows 25, 26, 27.

Functionality windows 25, 26, 27 shown in basic display area 24 in the exemplary embodiment are not final—they are expandable, and they display harvesting mode-specific machine and/or crop material parameters of forage harvester 1, which is in the harvesting mode. If, however, agricultural working or harvesting machine 2 is being driven on the road, it is feasible that a road-operation mode may be depicted in display unit 23, and that road operation-specific parameters of the working or harvesting machine are stored in functionality windows 25, 26, 27 of basic display area 24. The machine and/or crop material parameters stored in functionality windows 25, 26, 27 in basic display area 24 are controlled and set up, e.g., using operating devices 29, 30 located on the left in housing 22 of terminal 20.

When a functionality window 25 is selected, a background of a different color is displayed, and there is a separate visualization in an enlarged functionality window, which is not shown here. All information and/or functionalities of the machine and/or crop material parameters stored in functionality window 25, e.g., the working position of front attachment 3 in this case, are visualized in this functionality window, in a detailed, enlarged view. In addition, the maintenance intervals of forage harvester 1 may be read by activating functionality window 26. The sharpening intervals and the adjustment of shear bar 8 relative to chopper drum 6 are stored in functionality window 27.

Located in the center of basic display area 24, a rectangular functionality window 28 that is enlarged relative to functionality windows 26, 26, 27 permanently displays special machine and/or crop material parameters that are important to the harvesting operation and that must be monitored continually by operator 21. The following information is displayed: Time of day, engine speed, the gap width of post-accelerator 11, the setting of shear bar 8 relative to chopper drum 8, the number of operating hours, engine oil temperature, and ground speed, using various symbols which will not be described here in greater detail.

Fixedly specified parameters are displayed on the right side of basic display area 24, e.g., the engine speed and engine load drop in this case, which may be changed using means other than operating devices 29, 30. The lifting cylinder pressure and the current height of front attachment 3 are displayed in the left half of basic display area 24. Functionality windows that have not yet been filled with information are displayed in the lower region of basic display area 24, to the right and left of functionality window 28, which is shown in the center. The list of information presented above is not final. It may be modified and expanded.

Due to the large number of machine and/or crop material parameters depicted in display unit 23, operator 21 would be forced—due to the central operating structure for all machine and/or crop material parameters—to spend a great deal of time searching for functionality windows 25, 26, 27 containing the particular machine and/or crop material parameters required, some of which are located in submenus, in order repeatedly make adjustments to the same machine and/or crop material parameters, in the harvesting mode in particular, due to changing harvesting conditions. As a result, operator 21 is distracted from the actual control of the agricultural working or harvesting machine.

Figure 3:
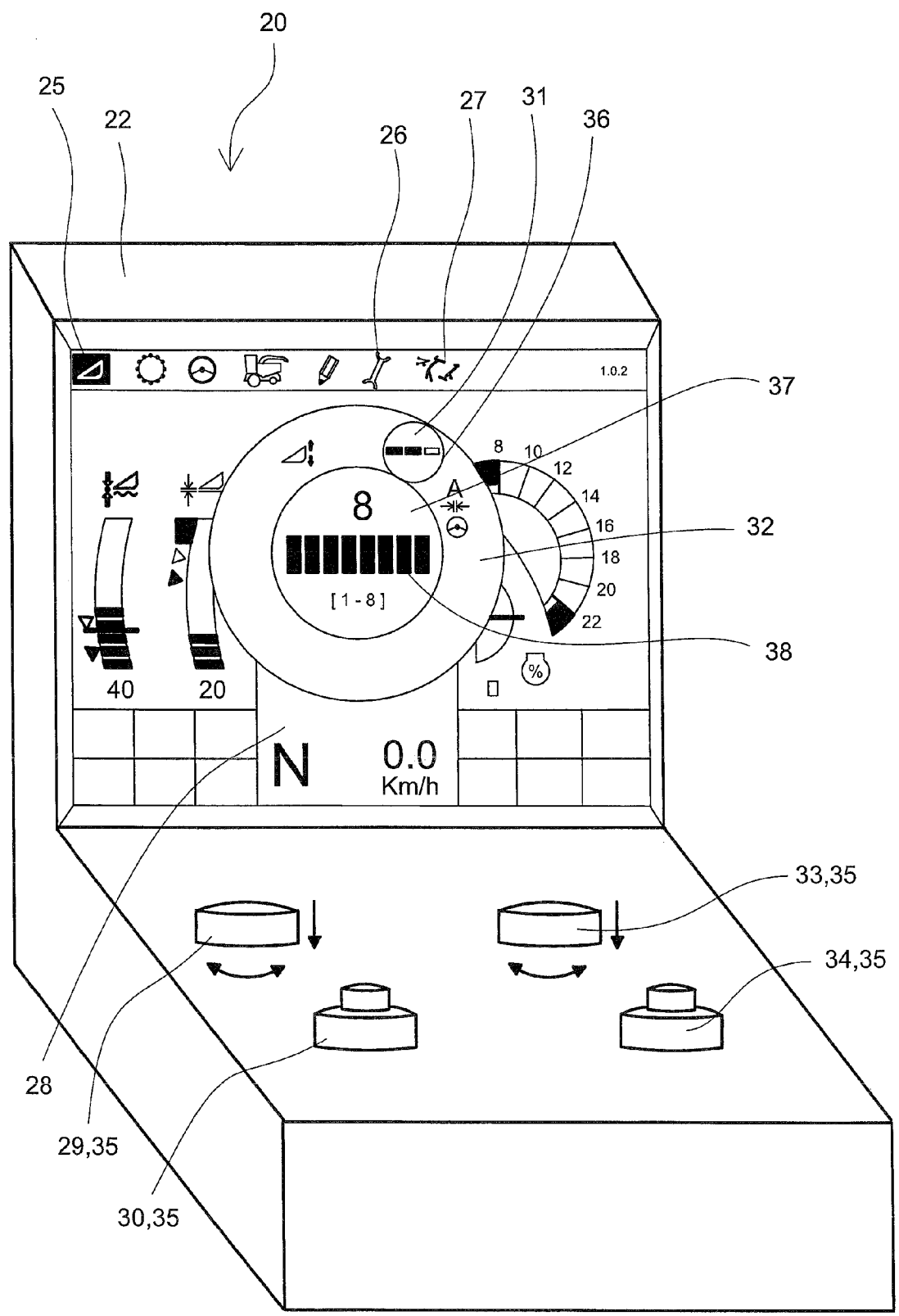
FIG. 3 shows a terminal with a basic display area and an additional display area depicted in a display unit.

As shown in FIG. 3, according to the present invention, and in the working or harvesting mode at the least, at least one additional display area 32 that includes at least one functionality window 31 superimposed on basic display area 24 is displayable in display unit 23, it being possible to activate additional display area 31 and control the machine and/or crop material parameters stored in the at least one functionality window 31 using separate operating devices 33, 34 located on the right side of housing 22 of terminal 20.

Operating devices 33, 34 are preferably located directly next to operating devices 29, 30 of basic display area 24, thereby enabling operator 21 to switch between operating devices 29, 30, 33, 34 easily and conveniently. The machine and/or crop material parameters set up in functionality windows 25, 26, 27 of basic display area 24 and in additional display area 32 are freely definable by operator 21. As a result, operator 21 is able to set up machine and/or crop material parameters that need to be adjusted several times during the working or harvesting operation, in particular, in functionality window 31 of additional display area 32, in order to access them quickly via separate operating devices 33, 34 and to quickly make adjustments.

Preferably, separate operating devices 29, 30, which serve to operate additional display area 32, and operating devices 29, 30 provided for basic display area 24 are designed as rotary knobs and/or push buttons that result in comfortable, simple use for operator 21 of agricultural harvesting machine 2. Operator 21 may rotate and/or press particular rotary knob and/or push button 35 to select individual functionality windows 25, 26, 27, 31 and make adjustments to the machine and/or crop material parameters set up in functionality windows 25, 26, 27, 31. Further embodiments of operating devices 29, 30, 33, 34 are feasible, e.g., switches or touchscreen buttons.

As shown in FIG. 3, additional display area 32, which is superimposed on basic display area 24, is successively depicted as a window in a window format, while the format of additional display area 32 is preferably a circular format, the size and position of which in basic display area 24 is freely selectable by operator 21. The circular format of additional display area 32 advantageously results in a visibly obvious delineation from rectangular basic display area 26. It is feasible to also select other formats in which to depict additional display area 32. Basic display area 24 remains visually dominant over additional display area 32, to allow operator 21 to recognize it as such.

The adjustment of the sub-width of front attachment 3 is stored in functionality window 31 in additional display area 32 as an example of an adjustable machine and/or crop material parameter. The activation of functionality window 31 is indicated in circular outline 36 of functionality window 31. Other means of visual emphasis and other background colors are feasible. When functionality window 31 is activated, a depiction appears in an enlarged functionality window 37, which is located inside additional display area 32 shown in FIG. 3 in a circular format.

The adjustment of the sub-width of front attachment 3 serves to specify the actual working width of front attachment 3 within which crop material 4 is picked up using front attachment 3 in the harvesting mode, in order to attain an exact yield calculation. In the example, the working width of front attachment 3 is adjustable in sub-widths between numerical values 1 and 8, which is also depicted graphically using a horizontal bar diagram 38.

Separate operating devices 33, 34, which are provided only for operation of additional display area 32 and which are designed as rotary knobs and/or push buttons 35, are used to call up additional display area 32, control functionality window 31, and adjust the sub-width of front attachment 3, thereby enabling operator 21 to quickly access these features during the harvesting operation and make adjustments that necessary due to changing harvesting conditions, such as adjusting the sub-width of front attachment 3.

To ensure that operator 21 of forage harvester 1 may easily see and read the information visualized in all functionality windows 25, 26, 27, 31, the minimum size of a functionality window 25, 26, 27, 31 is limited. In an advantageous refinement of the present invention, the size of additional display area 32 and/or of functionality windows 25, 26, 27, 31, 37 may be selected dynamically, thereby ensuring that the most suitable and largest display is always selected. It is also provided that the positioning of additional display area 32 in display unit 23 depends on which functionality window 25, 26, 27 was accessed most recently in basic display area 24, that is, functionality window 25, 26, 27 that was accessed most recently in basic display area 24 is not covered by additional display area 32 when it appears, thereby ensuring that operator 21 always has the most recent machine and/or crop material parameter setting entered in basic display area 24 in his field of view.

Additional display area 32 appears in display unit 23 when at least one operating device 33, 34—which is provided to operate additional display area 32 and is designed as a rotary knob and push button 35 in this case—is actuated. Additional display area 32 preferably disappears from display unit 23 when at least one operating device 29—which is provided to operate basic display area 24—is actuated. To ensure that operator 21 always has the information displayed in basic display area 26 in his field of view, it is provided in an advantageous refinement of the present invention that additional display area 32 disappears automatically after a freely definable period of time expires. It is also feasible that additional display area 32 may be hidden manually by operator 21 of agricultural harvesting machine 2.

It is also provided that, when a machine and/or crop material parameter stored in particular functionality window 25, 26, 27, 31, 37 exceeds or falls below a threshold value, display area 24, 32 containing functionality window 25, 26, 27, 28, 31, 37 is displayed in the foreground of display unit 22, and that functionality window 25, 26, 27, 31, 37 in which the threshold value is visualized is simultaneously displayed in an enlarged depiction, thereby ensuring that operator 21 is informed immediately and may implement corrective action. A threshold value may be, e.g., the critical working state of working unit 18 of agricultural harvesting machine 2 shown in FIG. 1. If working unit 18 experiences a continual heavy load, and if overload is imminent, this is clearly brought to the attention of operator 21 of agricultural harvesting machine 2 in a related functionality window, which is not shown here, so that operator 21 may intervene to make corrections, without the need to bring agricultural harvesting machine 2 to a complete stop.

It is within the scope of the ability of one skilled in the art to modify the exemplary embodiment described in a manner not presented, or to use it in other agricultural working or harvesting machines 2, e.g., combine harvesters or tractors, to achieve the effects described, without leaving the framework of the present invention.

It will be understood that each of the elements described above, or two or more together, may also find a useful application in other types of constructions differing from the type described above.

While the invention has been illustrated and described as embodied in an agricultural working machine, it is not intended to be limited to the details shown, since various modifications and structural changes may be made without departing in any way from the spirit of the present invention.

Without further analysis, the foregoing will so fully reveal the gist of the present invention that others can, be applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A machine selected from the group consisting of an agricultural working machine and a harvesting machine, comprising
    at least one working unit;
    a driver's cab having a display unit with a basic display area in which several parameters selected from the group consisting of machine parameters, crop parameters and both set up in different functionality windows are visualized;
    an operating device configured so that said parameters set up in the functionality windows are activated and controlled using said operating device, said display unit having at least one additional display area, having a functionality window superimposed on said basic display area such that in a working or harvesting mode at least, said at least one additional display area that includes the functionality window superimposed on said basic display area is displayable in said display unit; and
    at least one separate operating device configured for controlling and activating said functionality window of said at least one additional display area.

2. A machine as defined in claim 1, wherein said basic display area and said at least one additional display area are configured so that they are displayed in said display unit as windows in a window format.

3. A machine as defined in claim 2, wherein said at least one additional display area is configured to display in a circular format.

4. A machine as defined in claim 1, wherein a size of said at least one additional display area which contains said functionality widow is configured to be freely selectable.

5. A machine as defined in claim 1, wherein said basic display area in said display unit is configured to visually dominate said at least one additional display area.

6. A machine as defined in claim 1, wherein said at least one additional display area in said display unit is configured to depend on which functionality window was accessed most recently in said basic display area, that the functionality window that was assessed most recently in said basic display area is not covered by said at least one additional display area when said at least one additional display area appears.

7. A machine as defined in claim 1, wherein said at least one additional display area is configured to appear in said display unit when at least one certain operating device is actuated in order to operate said at least one additional display area.

8. A machine as defined in claim 1, wherein said at least one additional display area is configured to be displayed when at least one certain operating device is actuated in order to operate said basic display area.

9. A machine as defined in claim 1, wherein a depiction of said at least one additional display area in said display unit is terminatable manually by an operator.

10. A machine as defined in claim 1, wherein said at least one additional display area is configured to disappear automatically after a definable period of time.

11. A machine as defined in claim 1, wherein said functionality window of said at least one additional display area is configured to open automatically when a defined threshold value assigned to a particular one of said functionality windows is fallen below.

12. A machine as defined in claim 11, wherein said defined threshold value includes values selected from the group consisting of machine-specific values and crop-material specific values.

13. A machine as defined in claim 11, wherein said defined threshold value is a critical working state of said at least one working unit.

14. A machine as defined in claim 1, wherein said functionality windows are configured so that said parameters set up in said functionality windows are freely definable.

15. A machine as defined in claim 1, wherein said operating device for activating said basic display area, said at least one additional display area and said functionality windows located therein are configured as elements selected from the group consisting of rotary knobs, push buttons, and both.

* * * * *